United States Patent [19]

Sijtstra

[11] Patent Number: 5,720,584
[45] Date of Patent: Feb. 24, 1998

[54] TOOL FOR PRODUCING A CROWN WHEEL WHICH CAN MESH WITH A PINION WITH OBLIQUE TEETH, AND METHOD OF PRODUCING SUCH A CROWN WHEEL

[75] Inventor: Anne Lourens Sijtstra, Rotterdam, Netherlands

[73] Assignee: Crown Gear B.V., Enschede, Netherlands

[21] Appl. No.: 537,823

[22] PCT Filed: May 10, 1994

[86] PCT No.: PCT/NL94/00105

§ 371 Date: Nov. 8, 1995

§ 102(e) Date: Nov. 8, 1995

[87] PCT Pub. No.: WO94/26452

PCT Pub. Date: Nov. 24, 1994

[30] Foreign Application Priority Data

May 13, 1993 [NL] Netherlands ............... 9300826

[51] Int. Cl.$^6$ ........................................... B23F 5/00
[52] U.S. Cl. ................... 409/12; 409/32; 409/38; 409/43; 409/48; 409/51; 407/20; 451/47; 451/147
[58] Field of Search ............. 451/47, 147, 148; 407/23, 26, 20; 409/11, 12, 22, 23, 25, 26, 31, 32, 38, 50, 51, 13, 27, 28, 43, 48

[56] References Cited

U.S. PATENT DOCUMENTS

| | | | |
|---|---|---|---|
| 1,990,432 | 2/1935 | Guest et al. | 409/13 |
| 2,304,586 | 12/1942 | Miller | 29/103 |
| 2,308,891 | 1/1943 | Miller | 409/39 |
| 2,579,422 | 12/1951 | Handy et al. | 90/1.6 |
| 2,711,673 | 6/1955 | Miller | 409/12 |
| 5,494,475 | 2/1996 | Basstein et al. | 451/47 |

FOREIGN PATENT DOCUMENTS

| | | | |
|---|---|---|---|
| 925983 | 9/1947 | France . | |
| 656757 | 9/1977 | U.S.S.R. | 409/28 |
| 552600 | 4/1943 | United Kingdom . | |
| WO 92/09395 | 6/1992 | WIPO | B23F 15/06 |
| WO 92/11967 | 7/1992 | WIPO | B23F 15/06 |
| WO 94/17945 | 8/1994 | WIPO | 409/32 |

Primary Examiner—Andrea L. Pitts
Assistant Examiner—Christopher Kirkman
Attorney, Agent, or Firm—Deveau, Colton & Marquis

[57] ABSTRACT

In the production of a crown wheel which can mesh with a cylindrical pinion if the axes of rotation of the crown wheel and the pinion are not parallel, the workpiece from which the crown wheel is produced and a generating tool rotate at a ratio in the speed of rotation which corresponds to the proportion of the number of passes of the tool and the number of teeth of the crown wheel to be produced, and the tool is brought into engagement with the workpiece and is moved in such a way along the workpiece in a direction parallel to the axis of rotation of the cylindrical pinion that the tool works the tooth flanks of the crown wheel to be produced. When the center point of the tool is moved in a direction parallel to the axis of rotation of the cylindrical pinion which can mesh with the workpiece, and the teeth of which form an angle β with the axis of rotation of the cylindrical pinion, the workpiece acquires an additional rotation which is proportional to the product of this movement and the tangent of the tooth angle β of the cylindrical pinion. During this movement the angle between the axis of rotation of the tool and the plane through the axis of rotation of the cylindrical pinion parallel to the axis of rotation of the workpiece is constant.

6 Claims, 11 Drawing Sheets

TOOL FOR PRODUCING A CROWN WHEEL WHICH CAN MESH WITH A PINION WITH OBLIQUE TEETH, AND METHOD OF PRODUCING SUCH A CROWN WHEEL

The invention relates to the field of mechanical engineering in which gear wheels which can mesh with a cylindrical pinion are produced, and in which the axes of the pinion and the gear wheel to be produced form an angle with each other. Such gear wheels are known under the name of crown wheels when the shaft angle is approximately 90°.

The method of producing such crown wheels accurately by, for example, milling is known.

However, until now it has only been possible to work crown wheels which can mesh with pinions provided with straight toothing, but there is a need for crown wheels which can mesh with pinions provided with oblique toothing, inter alia because this permits a greater torque to be transmitted between pinion and crown wheel. The shape of the teeth of such crown wheels is complex, in view of the fact that the tooth is spiral and the angle which the tooth space forms with the radius vector towards the centre of the crown wheel is not constant.

The invention relates to a method in which such a crown wheel can be worked by means of a generating tool, and to a tool by means of which said method can be carried out.

The method according to the invention is a method of producing a crown wheel which can mesh with a cylindrical pinion if the axes of rotation of the crown wheel and the pinion are not parallel, in which the workpiece from which the crown wheel is produced and a generating tool rotate at a ratio in the speed of rotation which corresponds to the proportion of the number of passes of the tool and the number of teeth of the crown wheel to be produced, and in which the tool is brought into engagement with the workpiece and is moved in such as way along the workpiece in a direction parallel to the axis of rotation of the cylindrical pinion that the tool works the tooth flanks of the crown wheel to be produced. When the center point of the tool is moved in a direction parallel to the axis of rotation of the cylindrical pinion which can mesh with the workpiece, and the teeth of which form an angle $\beta$ (described more particularly below) with the axis of rotation of the cylindrical pinion, the workpiece acquires an additional rotation which is proportional to the product of this movement and the tangent of the tooth angle $\beta$ of the cylindrical pinion. During this movement, the angle between the axis of rotation of the tool and the plane through the axis of rotation of the cylindrical pinion parallel to the axis of rotation of the workpiece is constant.

The angle between the axis of the tool and the radius vector towards the centre of the crown wheel remains constant while this method is being carried out.

It has been found possible to carry out the method according to the invention on existing machines. In this case a tool whose pitch angle is equal to the tooth angle of the pinion can be used, but it has also been found possible to reduce this pitch angle. An advantage of reducing the pitch angle $\gamma$ is that the number of passes of the tool is reduced, which means that the number of teeth over which the workpiece rotates during one revolution of the tool is reduced. This means that at a given maximum speed of rotation of the turntable on which the workpiece is mounted it is possible to increase the speed of the tool while the working speed between tool and workpiece remains the same, with the result that the working time of the workpiece is reduced.

The invention will be explained in greater detail below with reference to the drawing.

The corresponding parts are shown by the same reference numbers in the various figures.

Figure 1:
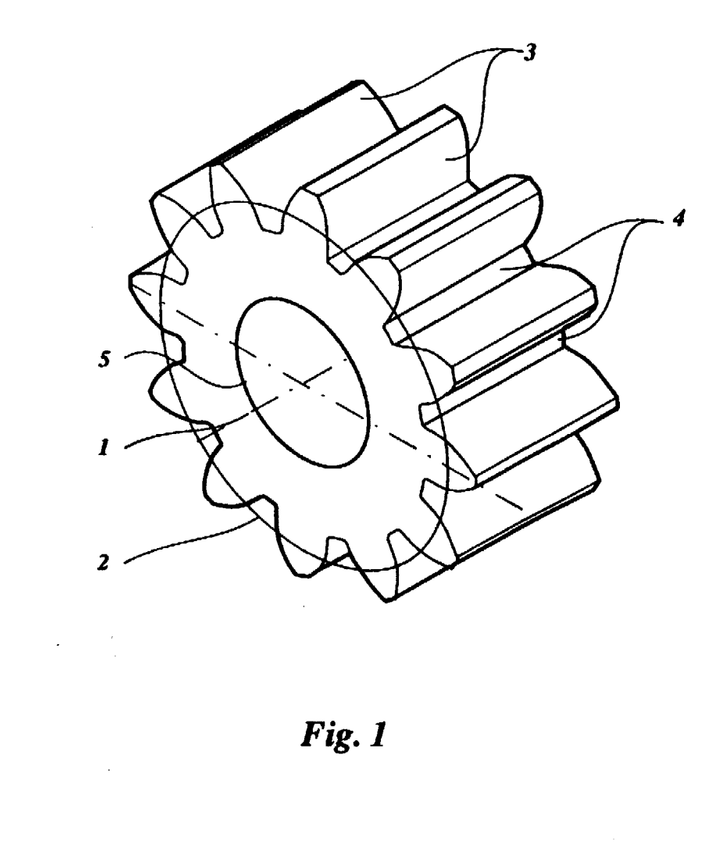
FIG. 1 shows a cylindrical pinion whose tooth direction is the same as the axis direction, so that this is a matter of straight toothing.

A cylindrical pinion with straight involute toothing, as shown in FIG. 1, has an axis 1 and a pitch circle 2, the teeth being indicated by 3 and the tooth spaces by 4. The shaft hole 5 is used for clamping the pinion during working or during use of the pinion.

Figure 2:
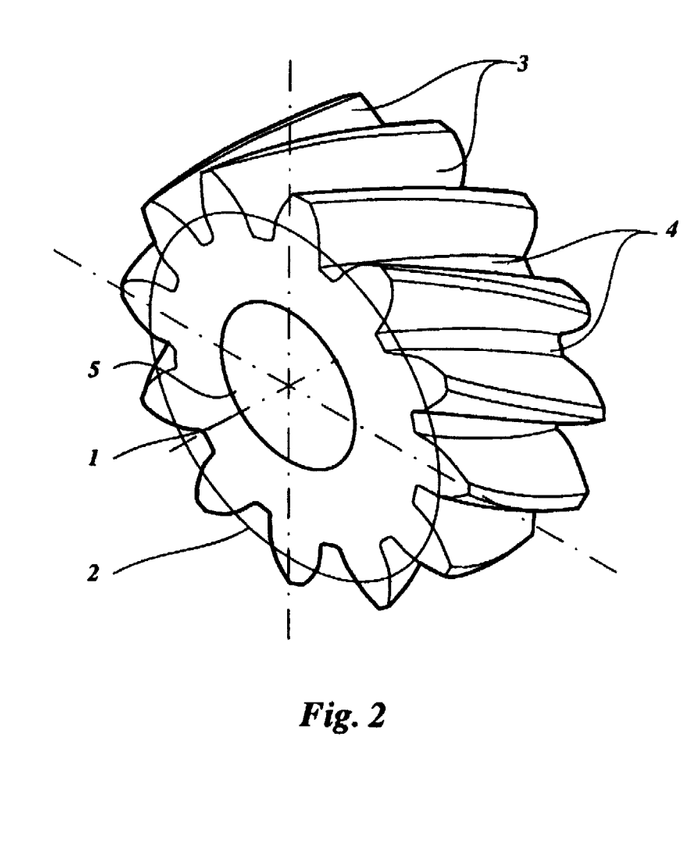
FIG. 2 shows a cylindrical pinion whose tooth direction forms an angle with the axis direction, i.e. oblique toothing.

FIG. 2 shows a cylindrical pinion with the same number of teeth and the same tooth shape as in the pinion of FIG. 1, in which the teeth are disposed helically. The pinion of FIG. 2 is thus an oblique-toothed pinion.

Figure 3:
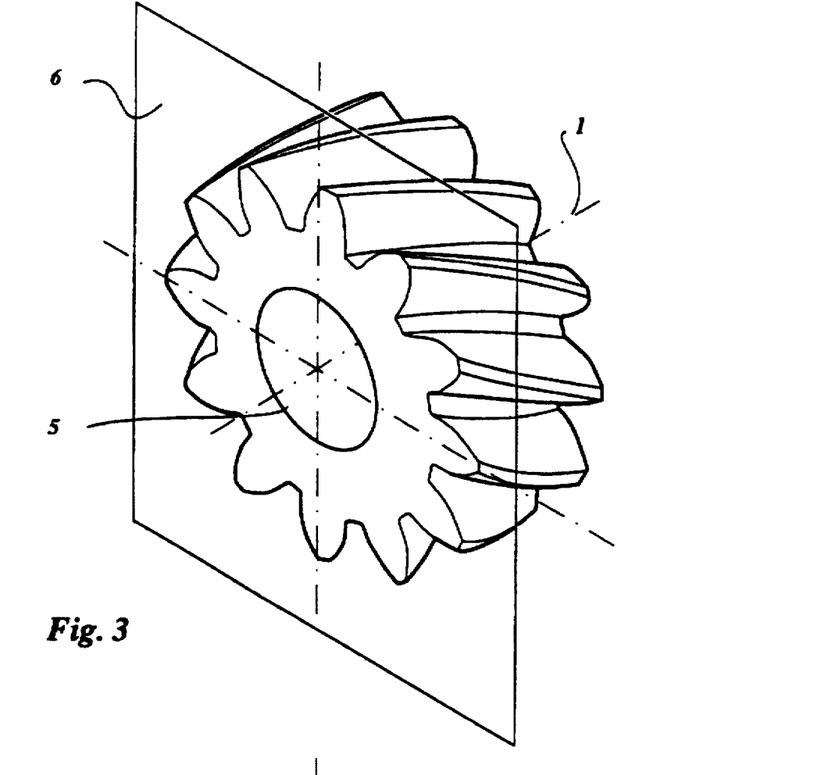
FIG. 3 shows a cylindrical pinion with oblique toothing having therein the transverse plane.

FIG. 3 shows the transverse plane 6, which is the plane at right angles to the axis 1.

Figure 4:
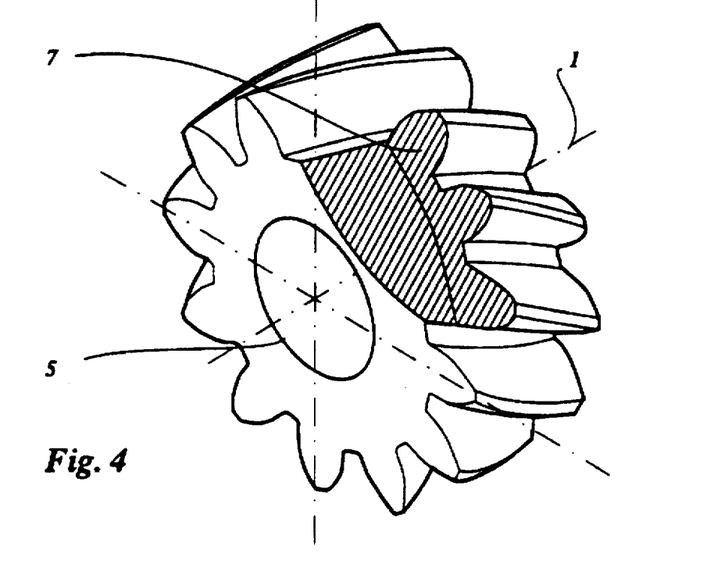
FIG. 4 shows a cylindrical pinion with oblique toothing having therein the normal plane.

FIG. 4 shows the normal plane 7, which is at right angles to the tooth flank. The production of an oblique-toothed pinion such as that shown in FIGS. 2 to 4 is based on a specific number of teeth, a tooth angle β, a specific profile shape and a normal module m, i.e. the module in the normal plane 7. As is known from gear theory, the normal module for oblique toothing is established in the shape of the tool by means of which an oblique-toothed gear wheel is produced, the normal module remaining the same if the tooth angle β and the number of teeth vary.

Figure 5:
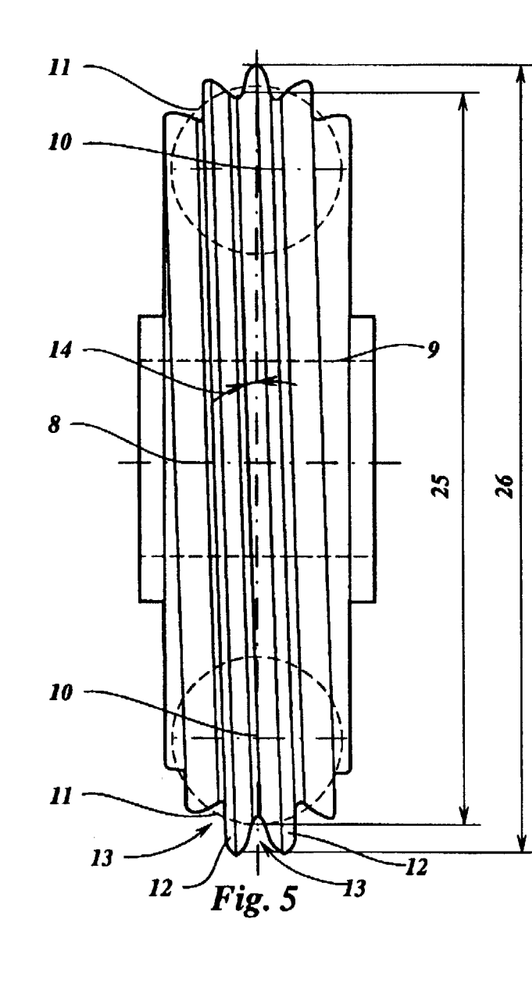
FIG. 5 shows the known tool for working crown wheels which can mesh with a pinion with straight toothing.

A known generating tool by means of which crown wheels meshing with straight-toothed pinions can be produced is shown in FIG. 5. In this case the axis of rotation of the tool is indicated by 8, and the bore by means of which the tool is clamped in the working machine is indicated by 9. The centre of the toothing of the pinion meshing with the crown wheel, from which the shape of the machining profile of the tool is derived, lies on a circle 10 around the axis of rotation 8. The pitch circle of this toothing is indicated by 11.

The outside diameter of the tool is indicated by 26, while the pitch circle diameter of the tool, i.e. the largest diameter on the toothing of the tool which corresponds to the pitch circle of the pinion, is indicated by 25. As can be seen in FIG. 5, this is a single-pass tool, in the case of which the workpiece from which a crown wheel is produced rotates over one tooth during a full revolution of the tool. The tool has helical ribs 12 and grooves 13 on the outer periphery, with a pitch angle 14 relative to the plane in which the circle 10 lies around the axis of rotation 8.

Figure 6:
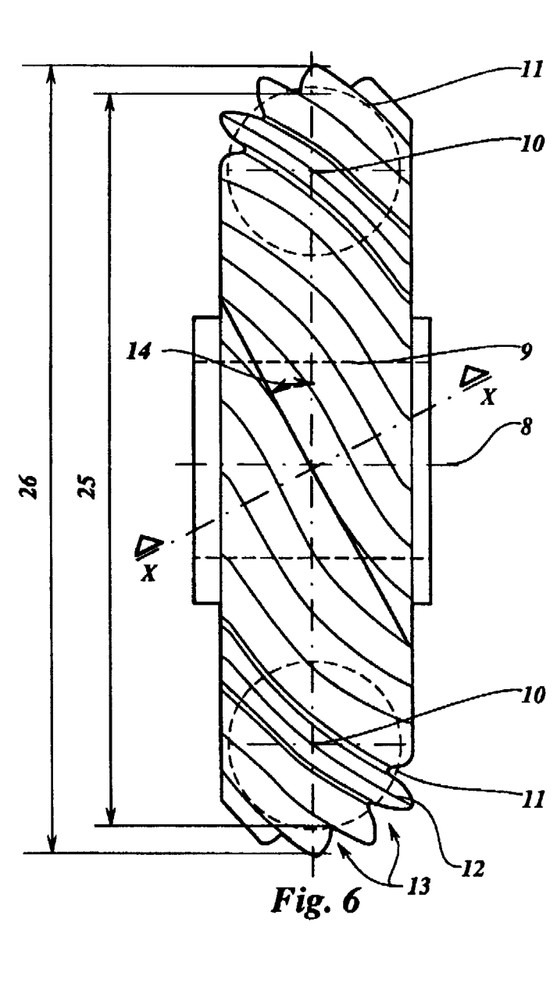
FIG. 6 shows the tool according to the invention for working crown wheels which can mesh with pinions with oblique toothing.

FIG. 6 shows a generating tool according to the invention which has dimensions which are comparable to those in FIG. 5. In this case the pitch angle 14 of the ribs of the machining profile of the tool is substantially greater than in the case of the tool in FIG. 5, with the result that the ribs 12 have also acquired a totally different shape. This large pitch angle 14 is achieved by making the toothing, which is derived from the transverse section 6 (see FIG. 3) of the oblique-toothed pinion meshing with the crown wheel to be produced, rotate about the axis of rotation of the tool with the centre on the circle 10, in which case the pinion rotates over a whole number of teeth for each rotation about the axis of rotation 8 of the tool. This number of teeth over which the pinion rotates is selected in such a way that the pitch angle 14 corresponds as far as possible to the tooth angle β of the oblique-toothed pinion.

Figure 7:
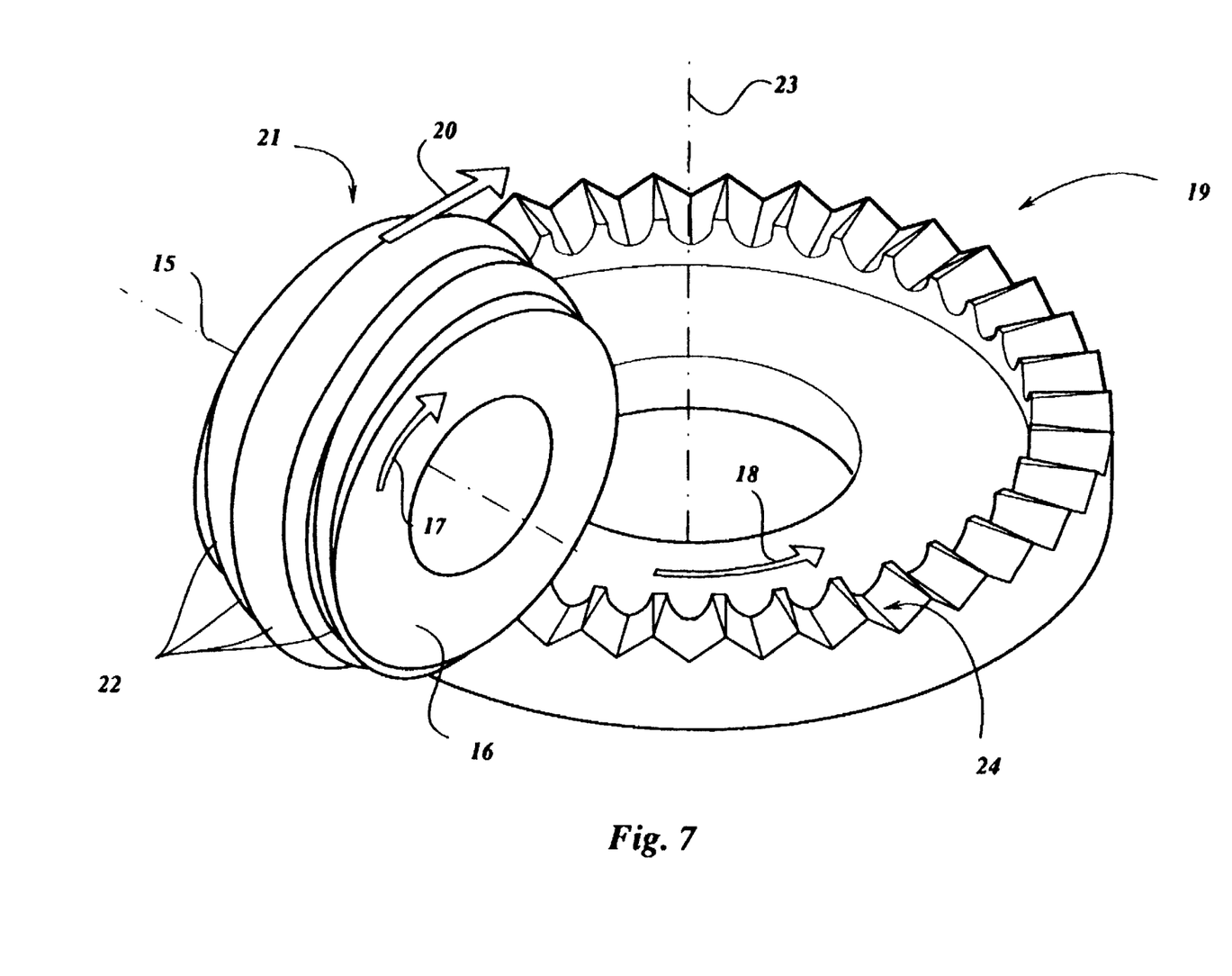
FIG. 7 shows a crown wheel being worked by means of a generating tool.

FIG. 7 shows the way in which the tool according to the invention is used for working a workpiece. In this case reference number 19 indicates the workpiece to be worked, and arrow 18 indicates the rotation of said workpiece about axis of rotation 23 during the working. The tool 16, which rotates in the direction of arrow 17 about axis of rotation 15, has a machining surface 21 consisting of ribs 22 which lie helically around the outer periphery. The ribs 22 work the tooth spaces 24, and the tool has a feed direction 20 towards the axis of the pinion shaft meshing with the crown wheel to be produced. The speeds of rotation of the tool and the workpiece are such that when there is a standstill in feed direction of the tool, on one full revolution thereof the workpiece rotates the same number of teeth as the number of passes n of the tool.

The tool moves in the direction of the axis of rotation of the pinion meshing with the crown wheel. With this feed movement the workpiece is given an additional rotation, which adapts the position of the workpiece to the rotation of the transverse section of the pinion occurring as a result of the tooth angle on movement in the direction of the axis. This additional rotation is proportional to the product of the tangent of the tooth angle β and the feed 'a' in the direction of the axis of rotation of the pinion.

Figure 8:
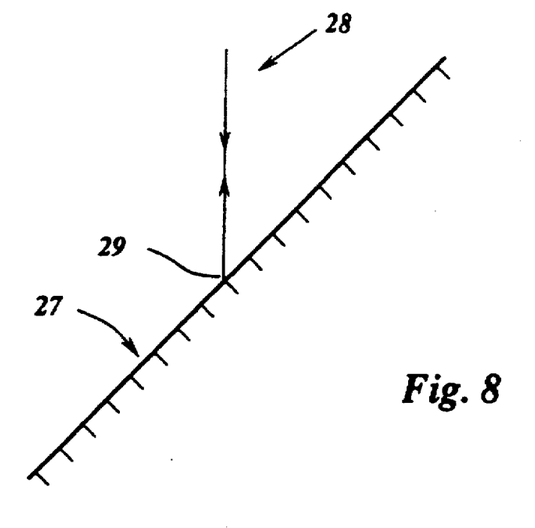
FIG. 8 shows the relative path of a point of the machining surface of the tool relative to the tooth flank of the crown wheel for the diameter of the tool at which the pitch angle $\gamma$ is equal to the tooth angle $\beta$ of the pinion meshing with the crown wheel.

FIG. 8 indicates by line 27 the tooth flank to be worked, while 28 indicates the relative path of one point on a specific diameter of the machining surface in one cross-section of the crown wheel tooth when the tool is moving through the tooth space. In the example shown here, the pitch angle of the tool is equal to the tooth angle of the pinion meshing with the crown wheel. As can be seen from FIG. 8, the relative movement in this case is a straight line which in its lowest point 29 ends on the expected tooth flank.

Figure 9:
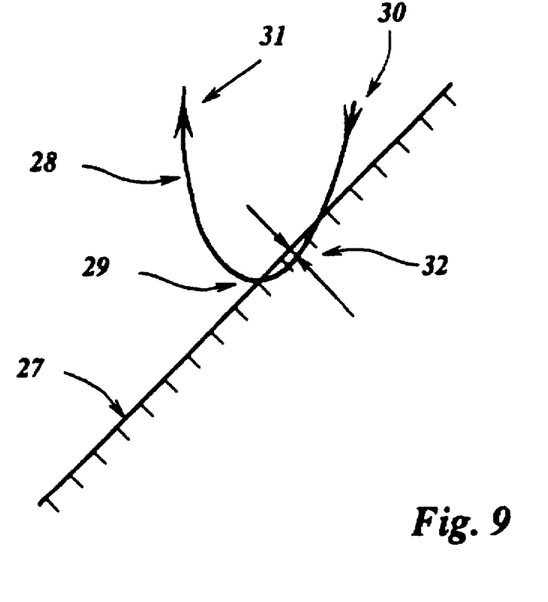
FIG. 9 shows the relative path of a point of the machining surface of the tool relative to the tooth flank of the crown wheel for the diameter of the tool at which the pitch angle $\gamma$ is not equal to the tooth angle $\beta$ of the pinion meshing with the crown wheel.

FIG. 9 shows the situation in the case of the other diameters, the relative path being indicated by 28. The machining surface runs to the tooth flank to be produced at 30 and leaves the area at 31. In this case the path is elliptical, with the lowest point 29 on the tooth flank 27 to be produced. As can be seen in FIG. 9, a part of the flank to be produced is cut away in this case. In FIG. 9 the deviation of the tooth flank is indicated by 32. This deviation can be calculated, so that the machining surface can be adapted in such a way that the deviation 32 is minimized or disappears.

The adaptations to the machining surface are admissible, because each point of the crown wheel tooth flank is made by one point of the machining surface of the tool. It has been found here that even when the tooth flank is worked during the feed or the run-out, each point of the tooth flank is worked only by one point of the machining surface. It has also been found that the adaptations to the machining surface depend on the pressure angle of the crown wheel and are more or less independent of the number of teeth of the crown wheel, so that all crown wheels which can mesh with a particular gear wheel can be made with one tool.

Figure 10:
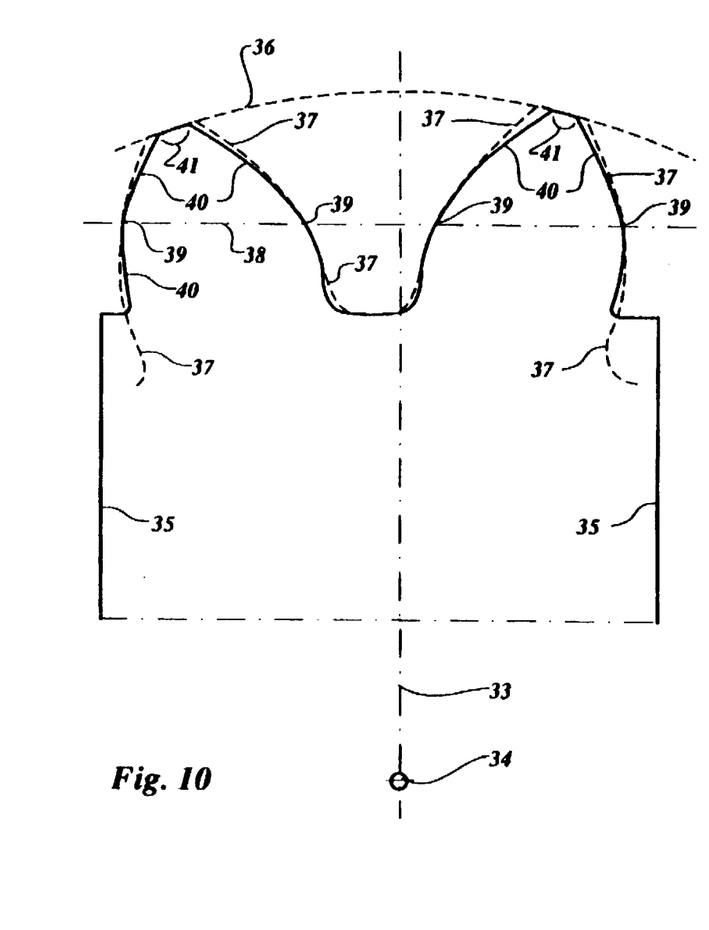
FIG. 10 shows the machining profile in cross-section X—X of FIG. 6, with the corrections made in the profile.

FIG. 10 shows the section X—X of FIG. 6, indicating the corrections possibly occurring in the machining surface. The centre of the machining surface is indicated by line 33, and the centre of the toothing of this surface is indicated by 34. This point 34 lies on the circle 10, which is situated at right angles to the axis of rotation of the tool and is shown in FIG. 6. The side of the tool is indicated by 35, and the outer periphery of the tool by 36. The profile 37 indicated by the broken line is the uncorrected profile of the machining surface, as it appears at right angles to the surface. This profile 37 corresponds to the normal profile of the oblique-toothed pinion meshing with the crown wheel to be worked.

The line 38 indicates the diameter of the machining surface and, in addition to the rotation of the workpiece, as a result of the axial movement of the tool in the direction of the axis of rotation of the pinion meshing with the crown wheel, there is an equal rotation in the opposite direction which is produced by holding the point of the tool situated at that diameter in one tooth cross-section. In the points 39 of the machining surface the relative path of the tool, in relation to the workpiece corresponds to the situation shown in FIG. 8, and is thus a straight line, with the tooth flank to be produced as the lowest point. In the points of the profile 37 away from point 39 the relative path of the tool in relation to the workpiece corresponds to the situation shown in FIG. 9, the lowest point of the elliptical path lying on the tooth flange and, a part of the tooth flank being cut away before or after the lowest point is reached. The tooth flank is thus worked during the feed or the run-out of the tool.

By calculating the deviation occurring in the case of this working during the feed or run-out, the adaptation to the machining surface which is necessary in order to allow a correct crown wheel still to be produced can be calculated. Line 40 indicates what this profile looks like. It can be seen from this that the corrections to be applied are limited through the fact that the tooth head 41 of the machining profile narrows. The size of the possible corrections is limited through the fact that said tooth head 41 must be a minimum thickness and may not be overcut.

Figure 11:
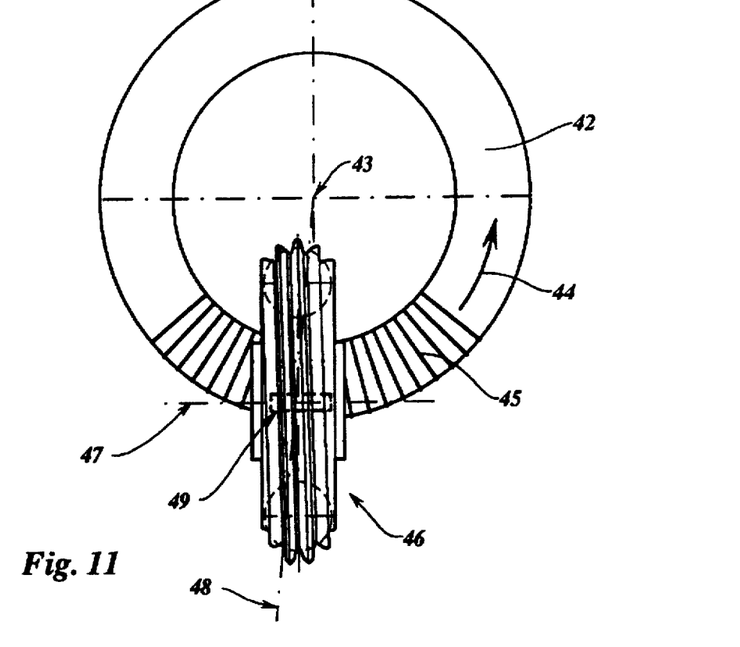
FIG. 11 shows in top view a crown wheel which can mesh with a straight-toothed cylindrical pinion being worked with a generating tool according to FIG. 5.
Figure 13:
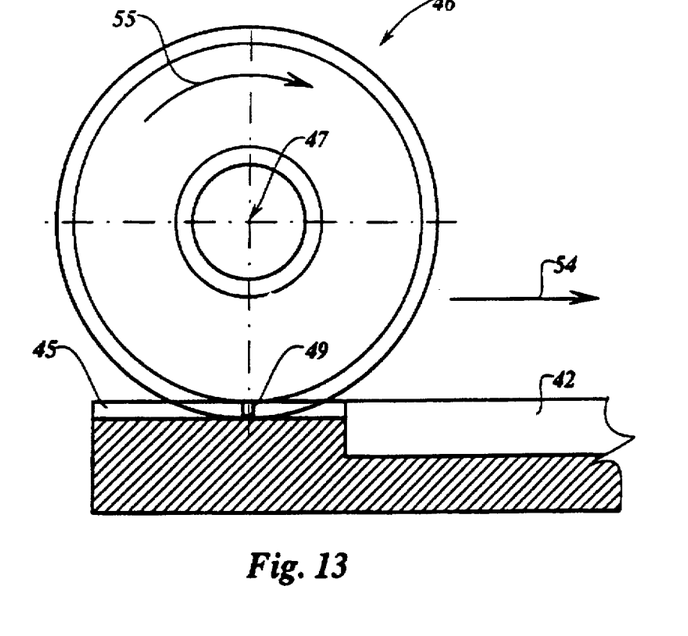
FIG. 13 shows in side view the working according to FIG. 11.

FIGS. 11 and 13 show a crown wheel which can mesh with a straight-toothed pinion being worked by the known tool shown in FIG. 5. The crown wheel 42 rotates about its axis of rotation 43 in the direction 44. The crown wheel is provided with straight toothing 45 which can mesh with a straight-toothed cylindrical pinion. The working is carried out by tool 46, which rotates about its axis of rotation 47 in the direction 55, and which is moved from the outside to the inside diameter in the direction 54, the centre point of the miller moving in plane 48. The rotations of tool and workpiece are coupled together in the proportion of the number of passes of the tool and the number of teeth of the workpiece. The flanks of the crown wheel are worked by the tool in the region 49, namely where the miller is deepest in engagement with the workpiece.

Figure 12:
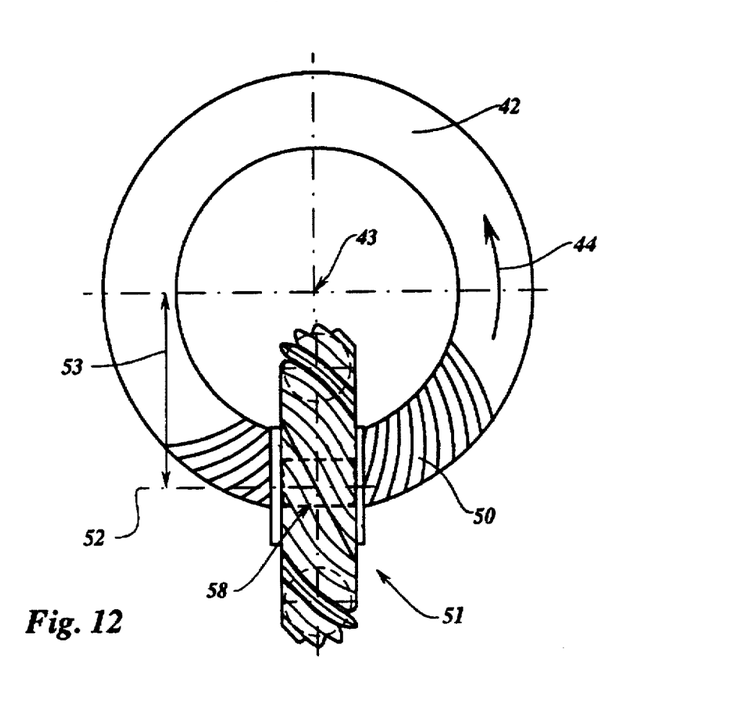
FIG. 12 shows in top view a crown wheel which can mesh with an oblique-toothed cylindrical pinion being worked with a generating tool according to FIG. 6.
Figure 14:
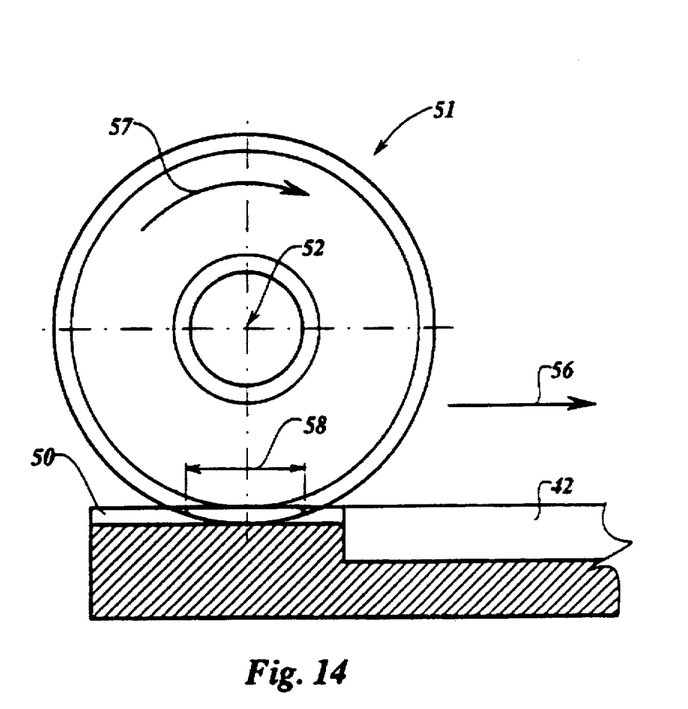
FIG. 14 shows in side view the working according to FIG. 12.

FIGS. 12 and 14 show a crown wheel being worked by a tool of the type shown in FIG. 6, in the case of which a generating process is applied to work a crown wheel which can mesh with an oblique-toothed cylindrical pinion. In this case the crown wheel 42 is provided with spiral toothing 50. The tool 51 is provided with a machining surface and moves from the outside diameter to the inside diameter in the direction 56. The crown wheel rotates about axis of rotation 43 in the direction 44, and the tool rotates about axis of rotation 52 in the direction 57. The rotations of tool and workpiece are coupled together in the proportion of the number of passes of the tool and the number of teeth of the workpiece. The tool 51 is provided with a machining profile, in which the pitch direction coincides with the direction of the tooth angle of the pinion meshing with the crown wheel. Due to the fact that the flanks of the crown wheel toothing are also worked during the feed and run-out, the working does not occur only in the lowest point of the tool path, but over the larger region 58.

During the working, the distance 53 between the axes of rotation 52 and 43 of tool and workpiece changes, with the result that the rotation of crown wheel relative to tool is influenced: for the spiral shape of the teeth means that when the tool is at a standstill the crown wheel must rotate when the distance 53 changes.

Figure 15:
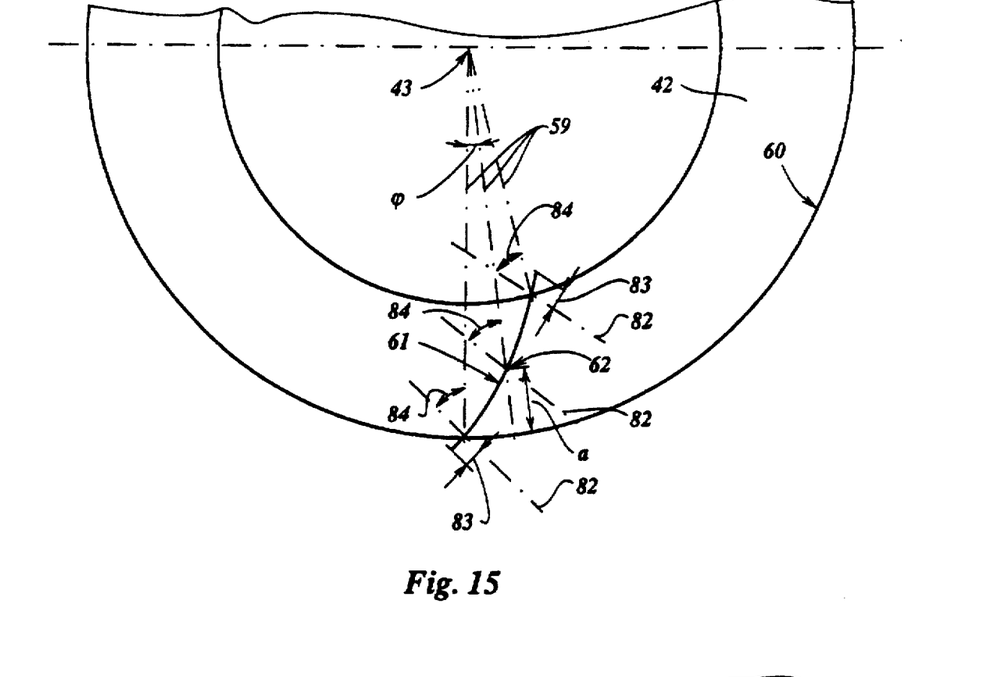
FIG. 15 shows in top view the shape of the tooth space of a crown wheel when the pinion and crown wheel axes intersect each other.

FIG. 15 shows the spiral shape of the teeth of the crown wheel. In this case 59 is the axis of the pinion meshing with the crown wheel 42, with an outside diameter 60. The centre of the crown wheel tooth is indicated by 61. During movement along the centre of the crown wheel tooth from the point on the outside diameter 60 to the point 62, the rotation of the workpiece about its axis is proportional to the product of the movement 'a' in the direction of the axis of rotation 59 of the pinion meshing with the crown wheel and the tangent of the tooth angle β of said pinion.

Figure 16:
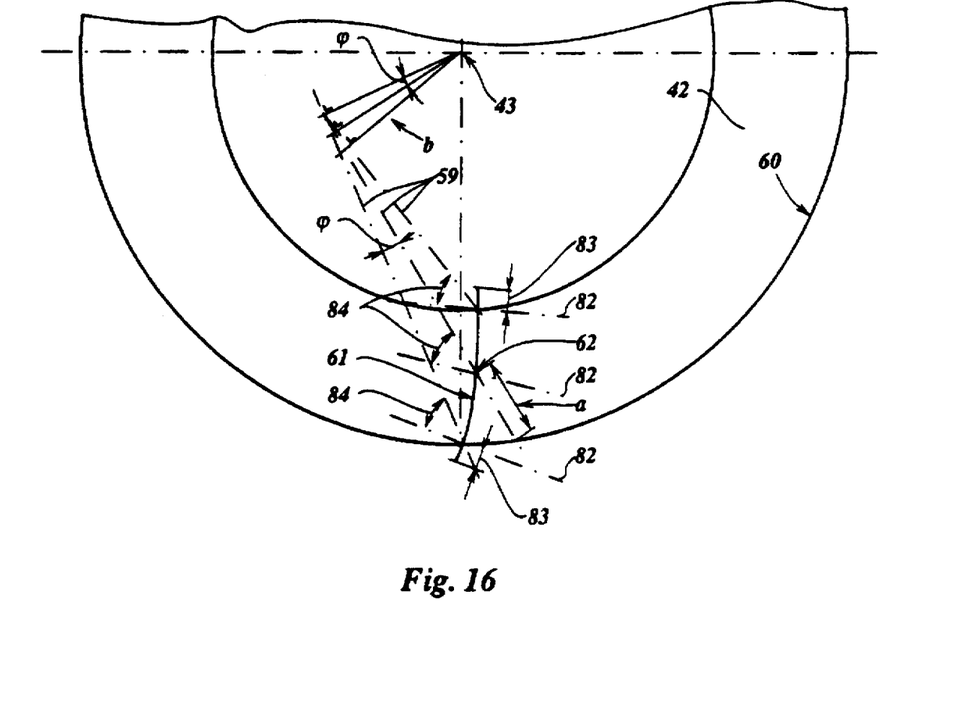
FIG. 16 shows in top view the shape of the tooth space of a crown wheel when the pinion and crown wheel axes cross each other.

The examples described above always show the embodiment in which the axis of rotation of the pinion meshing with the crown wheel intersects the axis of rotation of the crown wheel. However, as shown in FIG. 16, it is also possible for these axes to cross each other, in which case the pinion is placed off-centre at a distance b. The axis of rotation 59 in this case crosses the axis of rotation 43 of the crown wheel 42 at a distance b. For the rest, the same indications apply in FIG. 16 as those in FIG. 15, the main difference being that the spiral shape of the centre of the crown wheel tooth 61 is directed more radially.

Since the tooth flanks are partly worked during the feed and run-out, it is necessary for the centre of the tool to be taken to the desired tooth depth over a larger area than the width of the toothing. This is indicated by distance 83 in FIGS. 15 and 16.

The tool according to the invention can be either a miller or a grinding worm. The machining faces of the miller are preferably placed approximately at right angles to the direction of the ribs of the tool, so that the clearance faces lie approximately at right angles to the machining face. This produces the maximum strength and stability of the cutting edges.

Figure 17:
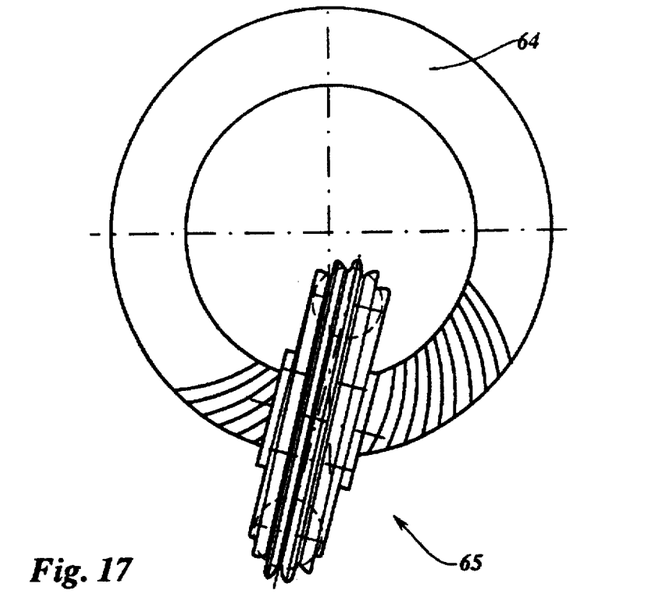
FIG. 17 shows in top view a crown wheel which can mesh with an oblique-toothed pinion being worked by a generating tool whose pitch angle is smaller than the tooth angle of the oblique-toothed pinion.
Figure 18:
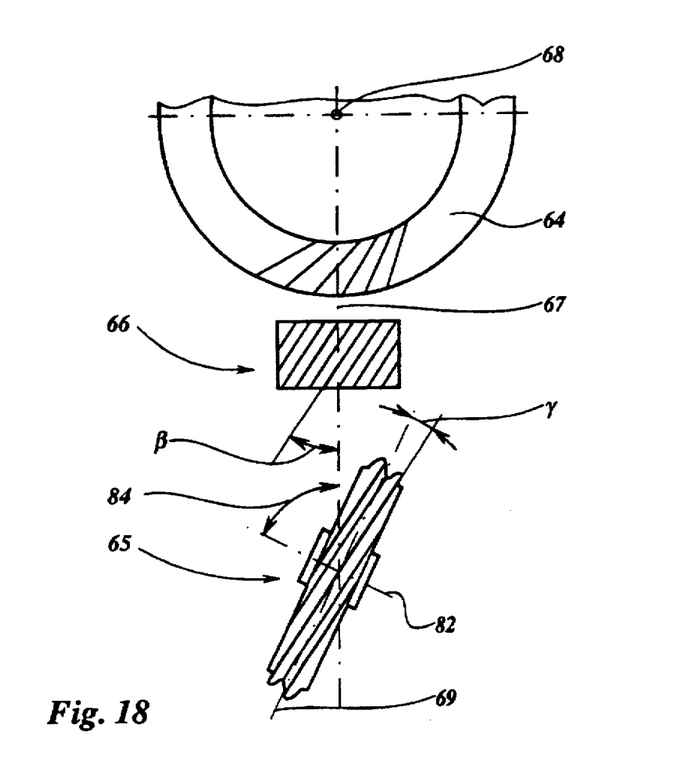
FIG. 18 gives a diagrammatic top view of how a crown wheel which can mesh with an oblique-toothed pinion is worked by a generating tool whose pitch angle is smaller than the tooth angle of the oblique-toothed pinion.

FIGS. 17 and 18 show a further development of the idea of the invention. In this case crown wheel 64, which can mesh with an oblique-toothed cylindrical pinion 66 with tooth angle β, is worked by tool 65, in which the direction of the profile of the machining surface forms an angle γ deviating from the tooth angle β with the plane 69 at right angles to the axis of rotation of the tool. In this case workpiece 64 and tool 65 are positioned relative to each other in such a way that the direction of the machining surface corresponds approximately to the direction of the teeth of the pinion 66 in the plane of the toothing of the crown wheel.

FIG. 18 shows all this diagrammatically. The crown wheel 64 to be worked is provided with spiral toothing, which can mesh with the cylindrical pinion 66, which can rotate about the axis of rotation 67. This axis of rotation 67 determines the crown wheel 64, and in the situation shown in FIG. 18 runs through the centre 68 of the crown wheel 64.

The toothing on the pinion 66 meshing with the crown wheel forms an angle β with the axis of rotation 67. The generating tool 65 is placed at a constant angle with the axis of rotation 67 of the cylindrical pinion, in such a way that the machining profile lies in approximately the same direction as the toothing of the crown wheel. This means that the machining profile forms approximately an angle β with the axis of rotation 67. The plane through the centre of the machining profile and at right angles to the axis of rotation 82 of the tool is indicated by 69. The direction of the ribs of the machining profile forms a pitch angle γ with plane 69, so that the angle 84 between the axis of rotation 82 of the tool and the plane in which the axis of rotation 67 lies, and which is parallel to the axis of rotation 68 of the crown wheel, is approximately (90°+γ−β).

It can be seen in FIGS. 15 and 16, and it can also be deduced theoretically, that the spiral teeth have a changing angle with the plane through the axis of rotation 59 of the pinion, and parallel to the axis of rotation 43 of the workpiece. However, it is found that the angle 84 between the axis of rotation of the tool 82 and the plane through the axis of rotation 59 of the pinion, and parallel to the axis of rotation 43, must be kept constant. The angle between the radius vector to the centre of the crown wheel and the centre of the tool is consequently also constant.

The pitch angle γ is smaller than β in the example of an embodiment, with the result that the corrections which have to be made in the profile of the tool are greater than in the case of the situation described in FIGS. 12 and 14. The possibility for making the corrections is limited, with the result that the possibilities for reducing the pitch angle γ of the tool are also limited.

Figure 19:
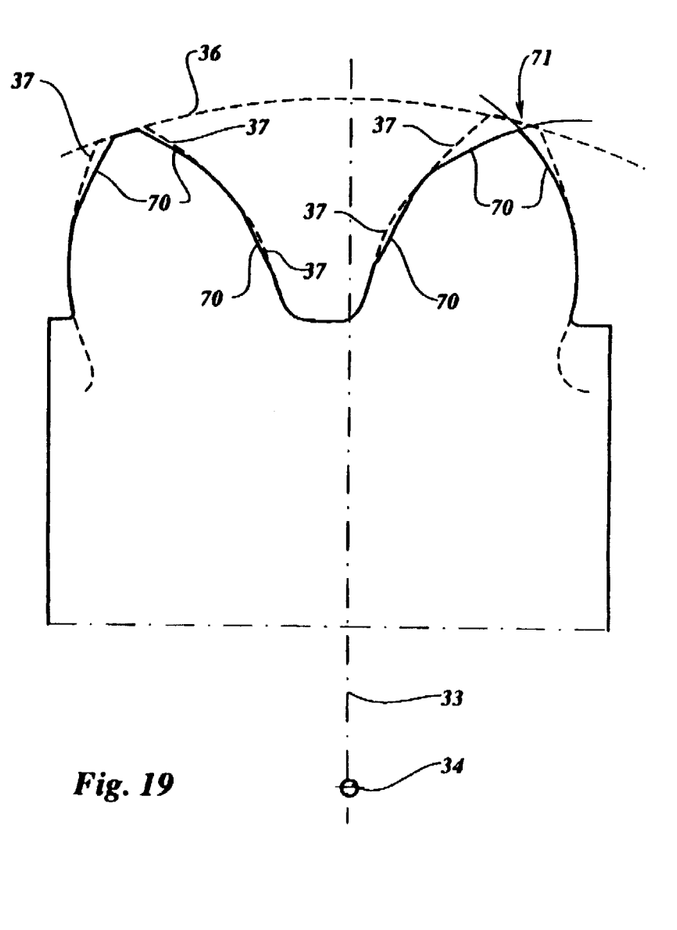
FIG. 19 shows the machining profile in section X—X of FIG. 6, with the corrections made in the profile, and in which the pitch angle of the tool is smaller than the tooth angle of the oblique-toothed gear wheel.

FIG. 19 shows a cross-section which is comparable to the cross-section in FIG. 10. The corrections which can be made in order to achieve a good working as in the situation shown in FIGS. 17 and 18 are indicated diagrammatically in the profile. In the case of such a working, the tooth angle β can be, for example, approximately 30°, in which case the pitch angle γ can then be approximately 12.5°. The dotted line 37 indicates the original normal profile of the oblique-toothed pinion, while the corrections made in the profile are indicated by 70. At 71 the correction is so great that the head of the working tooth is overcut, and a part of the flank of the crown wheel teeth will not be worked. No diameter at which the relative movement between workpiece and tool is a straight line can be established, because said diameter lies outside the working profile.

The size of the necessary corrections of the profile is calculated on the basis of the permitted pressure angles on the crown wheel. If these are limited, for example from 10° to 43°, the size of the corrections is limited. When the permissible corrections are being established, the size of the fillet of the crown wheel to be worked is also important, for if it is made too small, there is the risk of a pinion becoming jammed in the crown wheel, which is undesirable.

The calculation of the corrections to be made can be carried out, inter alia, by comparing the numerically established shape of the crown wheel teeth to be generated by means of the generating process with the numerically established shape of the machining profile for each relative position which tool and workpiece can assume relative to each other. Successive steps are thus always taken both in the lengthwise direction of the tooth space and in the direction of rotation of the tool. This calculation is shown diagrammatically in FIG. 20, the data 72 of the tool and the transmission being taken as the starting point. These data are, for example, the data of the characterizing pinion, such as number of teeth, tooth angle, profile correction and the like, and the miller data such as diameter and pitch angle. The shape of the tooth flanks and of the root of the tooth of the crown wheel is calculated in block 73 using these data. The shape of the teeth of the characterizing pinion is calculated in block 74, and the shape of the machining profile of the tool in a particular cross-section in block 75.

Figure 20:
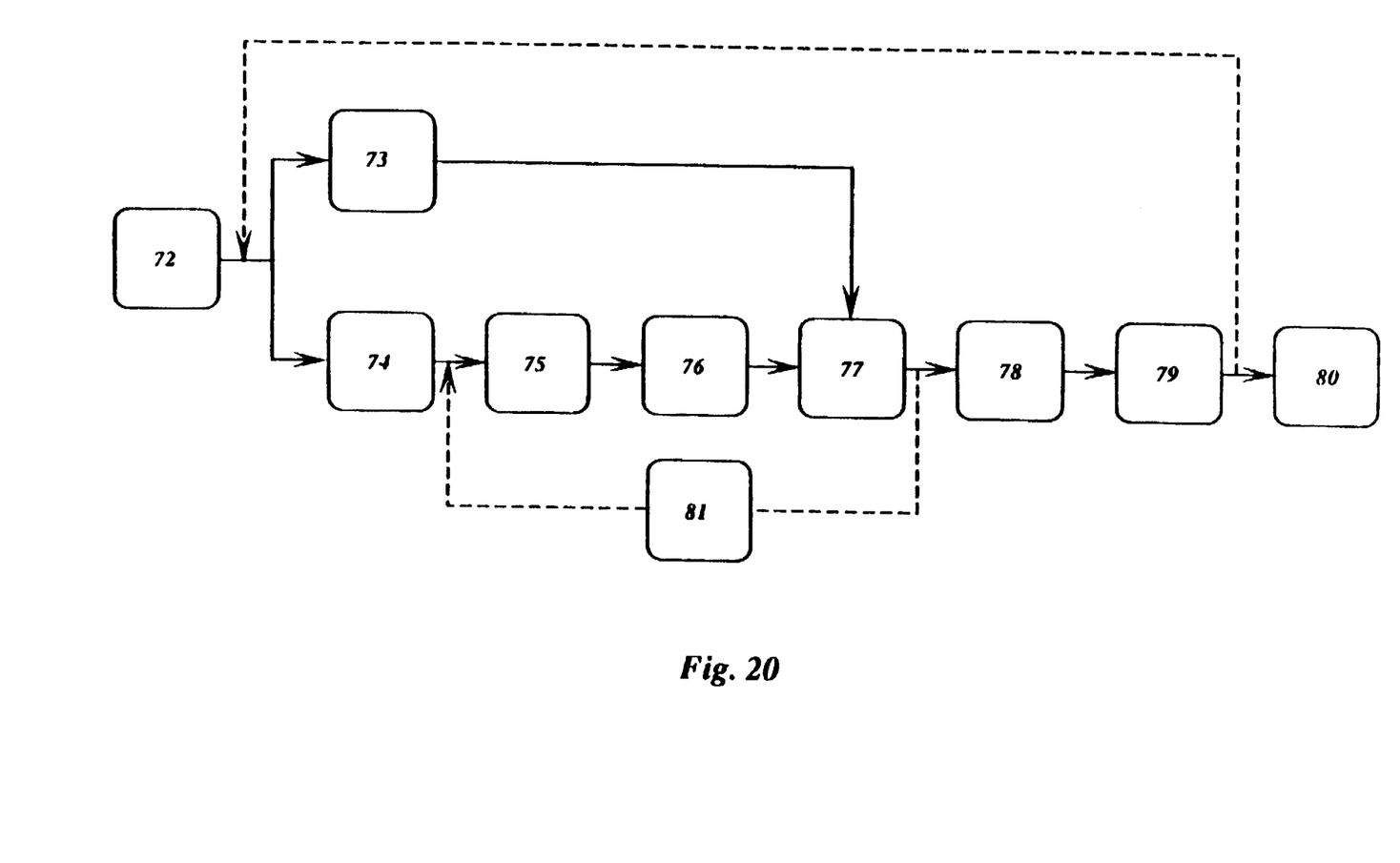
FIG. 20 shows diagrammatically the calculation of the corrections of the machining profile of the tool.

Using the tool data and the workpiece data, the relative movement of the machining profile of the tool and the tooth flank and the fillet of the workpiece is calculated in 76. In 77 they are compared with each other, and the corrections to be made in the machining surface are calculated. These corrections are compared in 78 with earlier calculated corrections, and the most representative are established. The calculation is then repeated after the tool has been rotated slightly in 81, and this repetition continues until the tool has been positioned in all relevant positions relative to the tooth space.

After all corrections which have been found necessary have been incorporated, it is checked in 79 by means of a simulation, which is also carried out by calculation, whether the tooth flanks are being generated correctly. If adjustments are necessary, the calculation is carried out again from 72. If no further adjustments to the calculated corrections are necessary, the corrected flank is calculated, and a numerical data file is established in 80. The tool can be made with the aid of this numerical data file.

It has been found from the calculations carried out that in the situation in which the pitch angle γ is equal to the tooth angle β the necessary corrections are smaller then when the tool diameter is greater. In the event of the pitch angle not being the same as the tooth angle, the corrections are generally smaller in the case of a smaller tool diameter. It is also found that the corrections depend on the feed direction, so that different tools are necessary for working operations in the same or in opposite directions.

This data file can be used in, for example, the making of a milling tool in which the milling cutters are placed around the periphery of the tool. The milling cutters are then made through the desired profile by means of spark erosion, the wire position being derived from the numerical data file.

If the tool is a grinding tool, the tool can be formed in the manner described in the published international patent application WO 92/11,967 in the name of Applicants which application is incorporated by reference as if fully set forth herein.

I claim:

1. Method for producing a crown wheel by means of a continuous generating process, which crown wheel can mesh with a helical toothed cylindrical pinion with a helix angle β in situations wherein a first axis of rotation of the crown wheel and a second axis of rotation of the pinion are non-parallel, comprising the steps of rotating a workpiece from which the crown wheel is produced about the first axis, rotating a generating tool about a third axis, said generating tool having a number of passes of cutting edges lying on the periphery of the tool as ridges and grooves under a lead angle γ with a plane perpendicular to the third axis, the speed of said rotation in a fixed ratio with respect to the rotation speed of the workpiece and the number of passes of cutting edges of the generating tool, bringing the tool into engagement with an active tooth flank of the workpiece which is limited by an inside radius and an outside radius, and moving the tool along the work piece in a direction parallel to the second axis, wherein during movement of the tool in the direction parallel to the second axis the workpiece is additionally rotated over a rotation angle which is proportional to the product of the distance of movement in the direction parallel to the second axis and the tangent of the helix angle β of the cylindrical pinion, and that during this movement the angle between the third axis and a plane through the second axis and parallel to the first axis remains constant.

2. Method in accordance to claim 1, wherein during machining of the flanks of the workpiece, the tool follows a path which is longer than the difference between the outside and inside radius of the workpiece.

3. Method in accordance with claim 1 wherein the angle between the third axis and the plane through the second axis and parallel to the first axis is essentially equal to 90°+γ−β, wherein γ is the lead angle of the generating tool and β is the helix of the cylindrical pinion.

4. Tool for producing crown wheels which can mesh with a helical pinion having a helix angle β, by means of a continuous generating process, wherein a generating tool and a workpiece rotate with a constant ratio of the speeds of rotation and move in such a way relative to each other that the tool machines the workpiece continuously, said tool comprising a disc which is rotatable about its axis, and being provided with machining elements on the periphery thereof; the cutting edges of the machining elements lying in the outer surface of a profile determining the shape of the teeth of a crown wheel to be produced with the tool, said profile extending essentially helically over the periphery of the disc with a lead angle γ, each cross-section of the helical profile having a center point which lies on a circle in a plane perpendicular to the axis of rotation of the tool, the center point of the circle lying on the axis of rotation, the profile of the cutting edges of said tool corresponding to the normal profile of said helical pinion.

5. Tool according to claim 4, wherein the profile is determined by the lead angle γ, the helix angle β and the feed direction of the tool.

6. A method for producing a crown wheel which can mesh with a helical pinion having a helix angle β, by means of a continuous generating process, said method comprising the steps of:

(a) rotating a workpiece at a first speed of rotation about a first axis, said workpiece having an inside radius and an outside radius, the difference between said inside radius and said outside radius defining a tooth depth;

(b) rotating a generating tool at a second speed of rotation about a second axis of rotation, said first and second speeds of rotation having a constant ratio, said generating tool comprising a disc rotatable about the second axis and comprising a periphery with a profile corresponding to the helical pinion and having a lead angle γ, each cross-section of said profile having a center point which lies on a circle in a plane perpendicular to the second axis of rotation, the center point of the circle lying on the second axis of rotation; and (c) applying the tool to the workpiece and moving the tool through said tooth depth to produce the crown wheel.

* * * * *